Feb. 24, 1931.   J. J. HOOKER   1,793,615
HOOK
Filed July 22, 1929
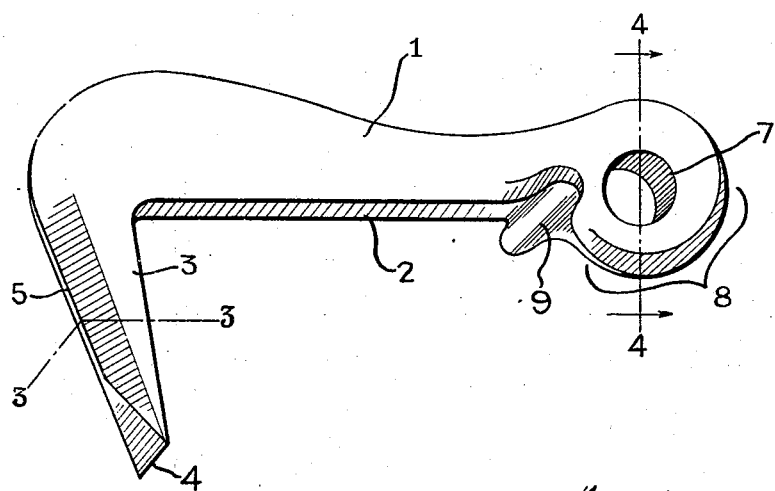
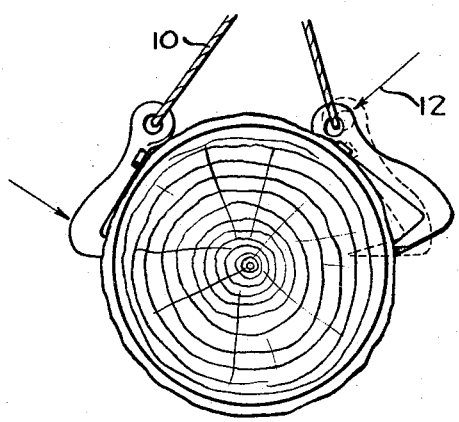
INVENTOR
Jesse J. Hooker.
BY
Cook & Robinson
ATTORNEY Patented Feb. 24, 1931

1,793,615

UNITED STATES PATENT OFFICE

JESSE J. HOOKER, OF EUGENE, OREGON, ASSIGNOR OF ONE-HALF TO ROLAND T. BURGHARDT, OF EUGENE, OREGON

HOOK

Application filed July 22, 1929. Serial No. 380,220.

This invention relates to logging hooks, and has particular reference to improvements in hooks of that certain character used extensively in logging operations for the lifting or handling of logs; such hooks, as a general rule, being used in pairs, and have ends equipped with eyelets for attachment to hauling or hoisting cables and their other ends formed with sharpened, laterally hooked prongs adapted to be driven into a log to secure the hook thereto for the lifting or hauling operation.

Heretofore, difficulty has been experienced in withdrawing or removing the prong from the log when it was desired to detach the hook, and it has been the principal object of the present invention to provide a construction whereby the act of withdrawing or removing the hook may be greatly expedited.

More specifically, the invention resides in providing the hook with a boss or enlargement located at the inner edge of the hook shank and between the prong and eyelet and adapted to serve as a supporting fulcrum for engaging the log and on which the shank may pivot, so that by the application of pressure, such as by the blow of a hammer, against the eyelet portion the prong will be withdrawn from the log and without the use of pry bars or the like, as is generally required.

Other objects of the invention reside in the various details of construction whereby pivotal action is made possible and the prong is rendered easy to withdraw.

Another object resides in sharpening the peripheral portion of the eyelet at one side so that it may cut into the log easily to permit the pivotal movement of the shank whereby the prong is withdrawn.

In accomplishing these objects of the invention, I have provided the improved details of construction, the preferred forms of which are illustrated in the accompanying drawings, wherein—

Figure 1 is a perspective view of a hook construction in accordance with the present invention.

Figure 2 is a cross sectional, or end, view of a log to which hooks of the present character have been applied one of the hooks being shown as being removed from the log.

Figure 3 is a cross sectional view through the prong taken on the line 3—3 in Figure 1.

Figure 4 is a cross sectional view through the eyelet, taken on the line 4—4 in Figure 1.

Referring more in detail to the drawings—

1 designates the shank portion of the hook. Preferably, this portion is flattened and is formed with a straight inner edge portion 2. At one end of the shank is a laterally directed prong 3 which is sharpened at the end, as at 4, and also sharpened along the outer edge, as at 5, so that it may be easily driven into a log. At the prong end the shank is substantially increased in width so as to give ample strength and stiffness to withstand the blows of a hammer, required for driving the prong into a log. At the end of the shank, opposite the prong, there is an eyelet 7 lying in the plane of the shank and of the prong and which is sharpened about its peripheral edge portion that faces in the direction of projection of the prong from the shank; the sharpened portion extending through an arc of approximately 180 degrees, as indicated at 8 in Figure 1.

Adjacent the eyelet, is an enlargement, or boss, 9, which projects at opposite sides of the shank and which lies substantially even with, or just slightly below the lower edge of the latter to serve as a supporting fulcrum on which the shank may pivot for the withdrawal of the prong from a log in which it has been driven.

In using such hooks, they are attached to a cable or the like, 10, and the prongs are driven into the log to be lifted as shown in Figure 2. Usually, such hooks are used in pairs and are applied to opposite sides of the log, as shown. When it is desired to remove the hook from the log, the blow of a hammer or sledge is directed against the top edge of the eyelet, as designated by direction and point of contact of the arrow 12 in Figure 2. This causes the sharpened edge of the eyelet to cut into the log and the shank to pivot on the enlargement or boss 9 in such manner that the pronged end will be pried out or withdrawn from the log; the taper of the prong and its direction being such that when it is slightly loosened, it comes easily from the opening which it has formed.

It is readily apparent that the fulcrum 9 may be located at any other desired point between the shank and the eyelet. It is also understood that the eyelet should be made of sufficient strength to withstand the application of the blows directed against it. Hooks of this character are easily and readily applied and, when provided with the fulcrum as illustrated, they may be easily and quickly withdrawn. Thus, the necessity of using prying bars or the like, as was heretofore required, is overcome.

Such hooks, also, may be made in various sizes and proportions without departing from the spirit of the invention, and other details of construction may be varied, as required, within the scope of the present claims, and for this reason, it is not desired that the claims limit the construction only to the details illustrated.

Having thus described my invention, what I claim as new therein and desire to secure by Letters Patent, is:

1. A device of the character described, comprising a shank portion provided at one end with a prong and at its other end with means for its attachment to a cable or the like, and an enlargement on the shank serving as a supporting fulcrum on which the hook may pivot for withdrawing the prong from an object to which the hook has been attached.

2. A hook of the character described, comprising a shank portion provided at one end with a laterally extending, sharpened prong and at its opposite end with means for receiving a connecting cable, and a supporting enlargement formed at one edge of the shank serving as a fulcrum on which the hook may pivot to effect the withdrawal of the prong from an object to which it has been applied; said cable receiving means being sharpened along one side to permit it to embed itself in the object.

Signed at Eugene, Oregon, this 2d day of February, 1929.

JESSE J. HOOKER.